United States Patent
Behrens

(10) Patent No.: US 12,428,919 B2
(45) Date of Patent: Sep. 30, 2025

(54) INJECTOR TILT-MOUNT LOCK

(71) Applicant: PREMIER COIL SOLUTIONS, INC., Waller, TX (US)

(72) Inventor: Randall Behrens, Sealy, TX (US)

(73) Assignee: PREMIER COIL SOLUTIONS, INC., Waller, TX (US)

( * ) Notice: Subject to any disclaimer, the term of this patent is extended or adjusted under 35 U.S.C. 154(b) by 0 days.

(21) Appl. No.: 18/437,823

(22) Filed: Feb. 9, 2024

(65) Prior Publication Data
US 2024/0271494 A1   Aug. 15, 2024

Related U.S. Application Data

(60) Provisional application No. 63/444,329, filed on Feb. 9, 2023.

(51) Int. Cl.
*E21B 19/22* (2006.01)
*E21B 15/00* (2006.01)
*F16B 19/02* (2006.01)

(52) U.S. Cl.
CPC ............ *E21B 19/22* (2013.01); *F16B 19/02* (2013.01)

(58) Field of Classification Search
CPC .......... E21B 19/22; E21B 15/00; E21B 49/02; E21B 4/02; F16B 19/02; F16M 11/20
USPC ......................................... 166/379
See application file for complete search history.

(56) References Cited

U.S. PATENT DOCUMENTS

| | | | | |
|---|---|---|---|---|
| 4,265,304 A | * | 5/1981 | Baugh | E21B 7/02 173/147 |
| 4,336,840 A | * | 6/1982 | Bailey | E21B 7/02 254/93 VA |
| 5,842,530 A | * | 12/1998 | Smith | E21B 15/003 166/77.2 |
| 6,003,598 A | * | 12/1999 | Andreychuk | E21B 19/22 166/77.2 |
| 7,549,468 B2 | * | 6/2009 | Pleskie | E21B 19/22 166/384 |
| 8,887,800 B2 | * | 11/2014 | Havinga | E21B 19/22 166/77.2 |
| 9,027,287 B2 | * | 5/2015 | Trevithick | E04H 12/187 52/112 |
| 9,574,411 B2 | * | 2/2017 | Behrens | E21B 19/22 |
| 10,384,907 B2 | * | 8/2019 | Upmeier | E21B 7/02 |
| 12,060,753 B2 | * | 8/2024 | Witte | E21B 19/22 |
| 2007/0131432 A1 | * | 6/2007 | Pleskie | E21B 19/22 166/380 |
| 2011/0067887 A1 | * | 3/2011 | Moncus | E21B 19/22 166/77.2 |
| 2013/0056276 A1 | * | 3/2013 | Rousseau | E21B 19/22 175/58 |
| 2015/0315861 A1 | * | 11/2015 | Zachariasen | E21B 15/003 166/77.2 |
| 2016/0040488 A1 | * | 2/2016 | Behrens | F16M 11/2021 166/77.2 |

(Continued)

*Primary Examiner* — Nicole Coy
*Assistant Examiner* — Douglas S Wood
(74) *Attorney, Agent, or Firm* — HUNTON ANDREWS KURTH LLP

(57) ABSTRACT

An injector tilt and stowage mechanism has a potential safety concern if retaining pins are not in place when the injector is tilted for stowage. A mechanical latching system is designed that secures the injector and simultaneously engages or disengages the hydraulic system to prevent movement in an unsecured condition.

5 Claims, 8 Drawing Sheets

(56) References Cited

U.S. PATENT DOCUMENTS

2016/0040489 A1* 2/2016 Behrens .................. E21B 19/22
166/77.2

* cited by examiner

Figure 1
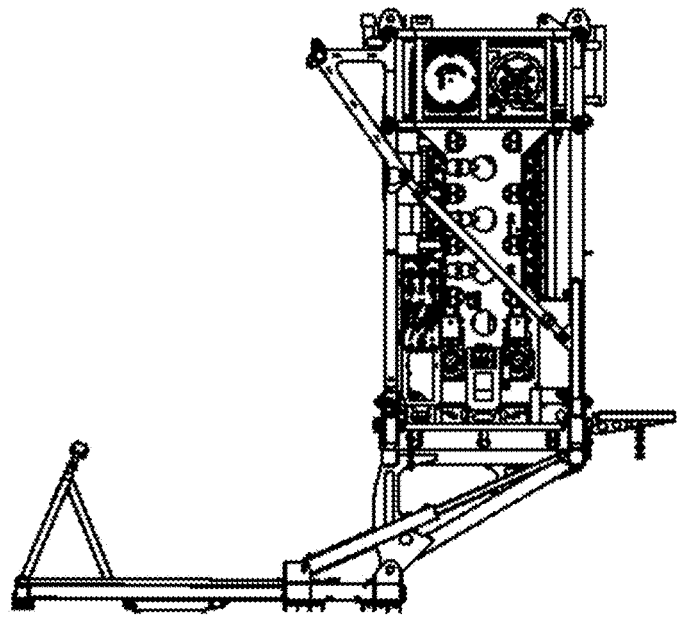
Injector in Deployment Position
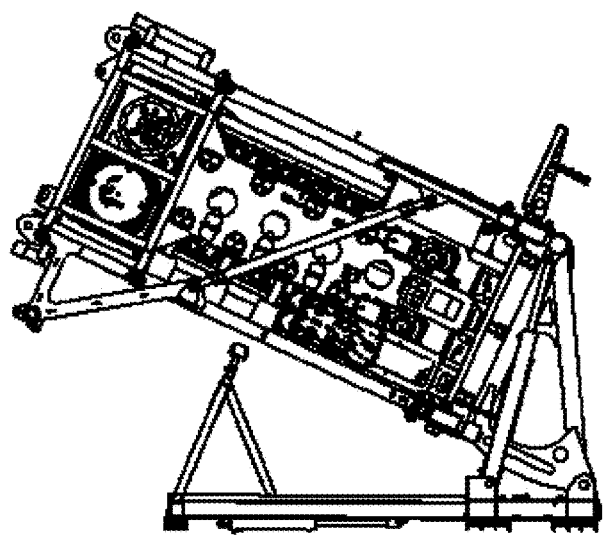
Injector in Stowed Position

Figure 2 – Prior art

Figure 5
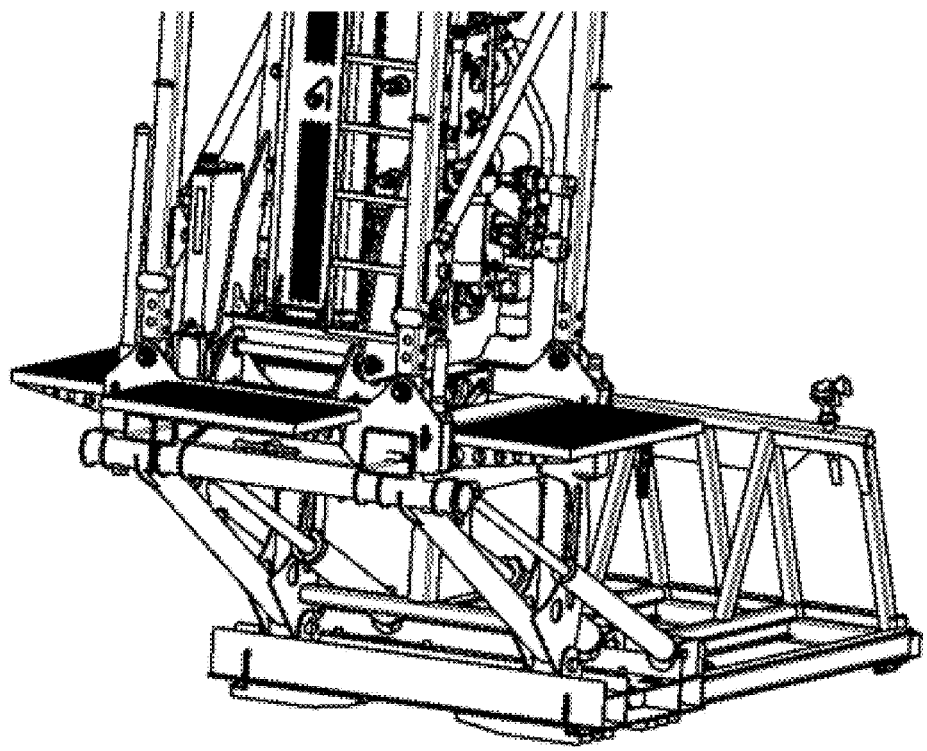
Latching Mechanism Installed
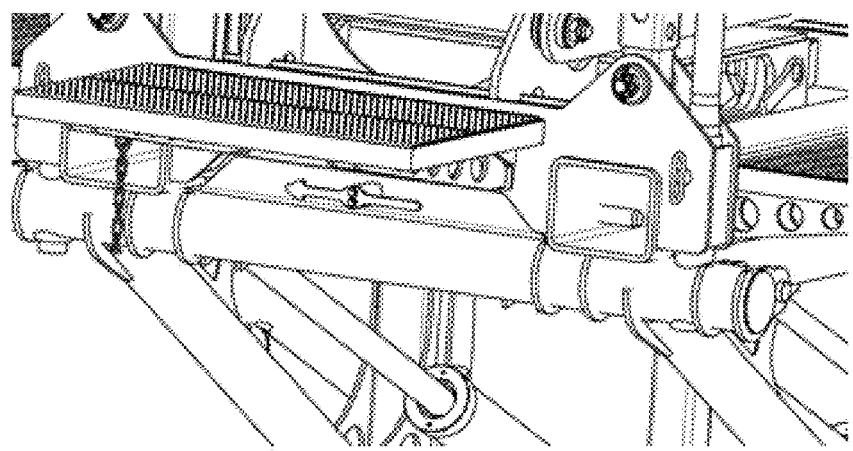
Closeup View of Latching Mechanism Installed

INJECTOR TILT-MOUNT LOCK

CROSS-REFERENCE TO RELATED APPLICATIONS

The present application claims priority to U.S. Provisional Application No. 63/444,329 filed Feb. 9, 2023 which application is incorporated by reference herein. U.S. Pat. Nos. 11,885,185 and 9,574,411 are also incorporated herein by reference.

FIELD OF THE INVENTION

The present application pertains to mechanical latching systems for Coiled Tubing Units which provide a visual indication of the current latched/unlatched state.

BACKGROUND AND SUMMARY

In the normal course of rigging up a Coiled Tubing Unit, an injector head is raised from a stowed, tilted position for travel to an upright position for removal and deployment for operation. For rigging down, the injector is returned to the stowed, tilted position. The injector is currently kept in place by retaining pins which are manually inserted and removed by personnel. If these pins are not in place when the injector is moved into the stowed position, the injector can come off of the mounting rack and fall onto the CTU deck. This is a potentially hazardous event for personnel safety and equipment damage.

What is needed are alternative systems and methods that provide for better safety and reduce risk of equipment damage. Advantageously, the present application provides such systems and methods.

BRIEF DESCRIPTION OF THE FIGURES

FIG. 1 shows an injector in a deployment position and a stowed position

FIG. 5 shows a side view and a closeup view with the retaining mechanism, i.e., latching mechanism, installed

DETAILED DESCRIPTION

Figure 2:
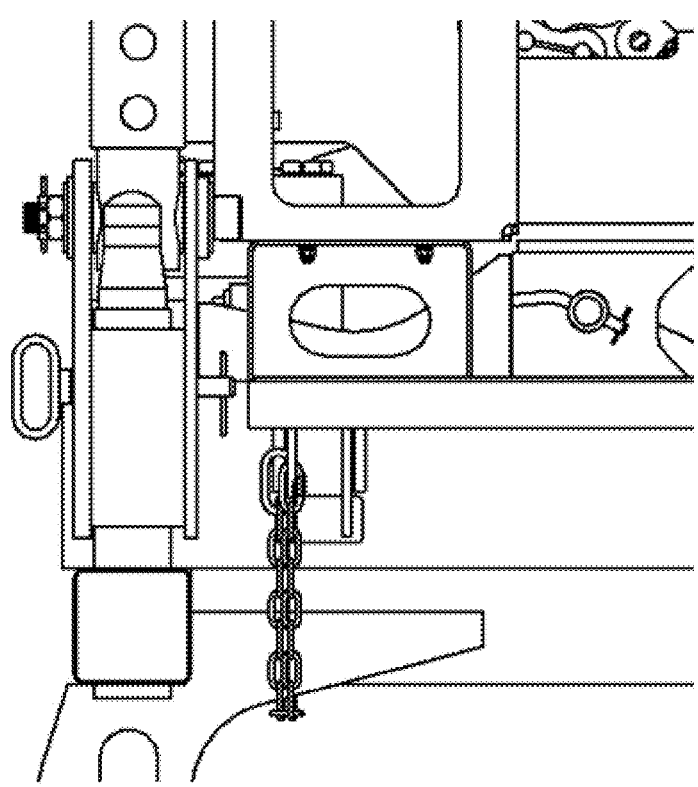
FIG. 2 shows standard manually placed retaining pins.
Figure 3:
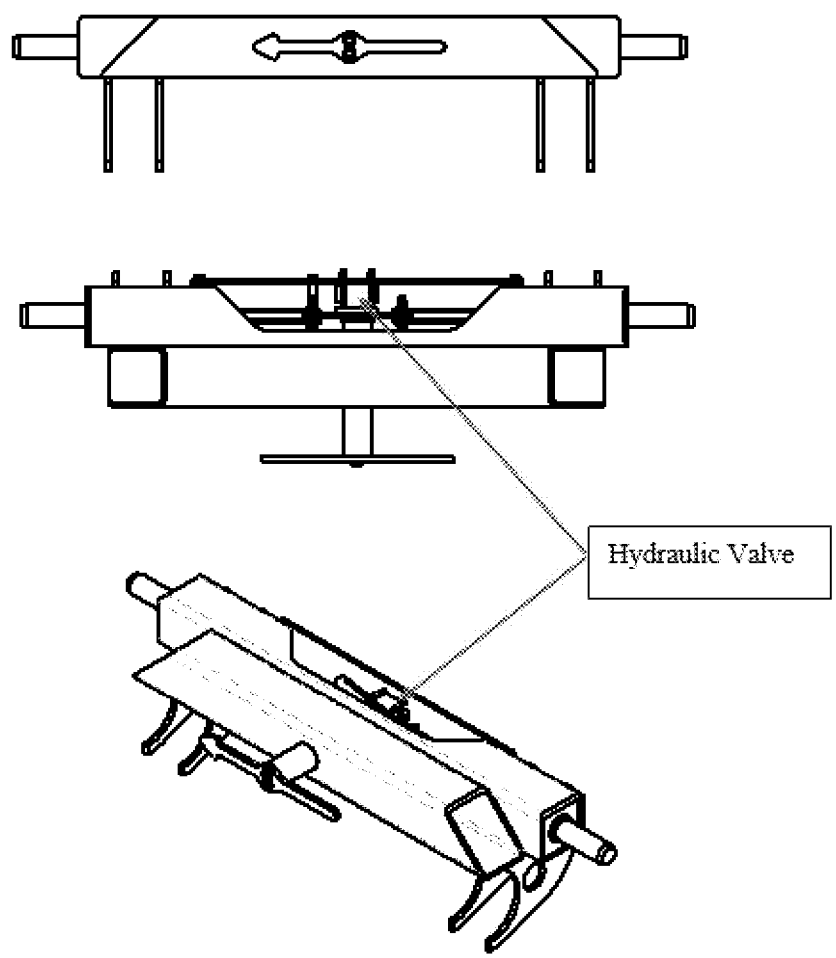
FIG. 3 shows a retaining mechanism in a locked position and a hydraulic valve.
Figure 4:
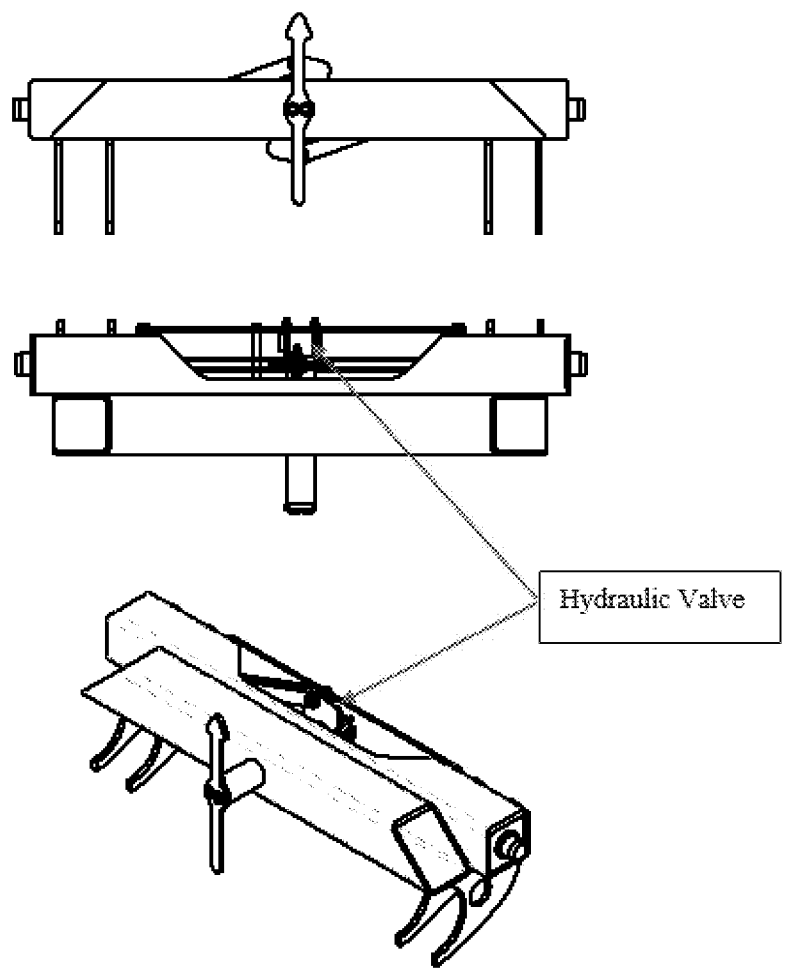
FIG. 4 shows the retaining mechanism of FIG. 3 except that the retaining mechanism is in a locked position.

Mechanical Latching System for Moveable Injector Head

A mechanical latching system is added which provides a visual indication of the current latched/unlatched state. One movement is required versus four movements to install pins on all four injector mount posts. Additionally, the movement to engage the locking pins also actuates a valve which enables/disables hydraulic function. In this way, movement of the injector mount is not possible when the latching system is in an unsecured, i.e., unlocked, condition.

A mechanical latching system is installed on a Coiled Tubing Unit for deployment and stowage of the injector head. As a unit is ready to rig up, the injector head is tilted over in a stowed position. The injector is in a latched condition and the associated hydraulic circuit is active. The injector is then raised up hydraulically in preparation for deployment. Field personnel then rotate the handle actuator to disengage the latching pins. As the pins are unlatched, the hydraulic circuit is the blocked to prevent unsafe movement. The injector is then removed from the CTU for deployment.

Reversing the movement returns the equipment to a safe condition. The injector is returned to the mount. Field personnel engage the locking pins 10 by rotating the handle 20 actuator. As this is completed, the hydraulic circuit 30 is then activated. Now the injector is in a secured condition and tilt over movement is allowed. At all times, there is visual indication 40 of the current state. This is shown in the FIGS. 1-5.

Electrical or hydraulic remote actuation may be employed if desired. A clasp type of retention or other retention could be employed in place of pins as shown in the figures.

The aforementioned mechanical latching system may be employed with any moveable injector head comprising a plurality of injector mounts or posts such as those described below.

Moveable Injector Head

An injector head tilt mechanism and method for raising an injector head is disclosed. The injector head tilt mechanism may be on a coiled tubing unit. The coiled tubing unit may include a complete set of equipment necessary to perform standard continuous-length tubing operations in the field. For example, the coiled tubing unit may comprise a reel for storage and transport of coiled tubing, an injector head to provide surface drive force to run and retrieve coiled tubing, a control cabin from which an equipment operator may monitor and control the coiled tubing, and a power pack to generate hydraulic and pneumatic power required to operate the coiled tubing unit. The coiled tubing units may further comprise other equipment for continuous-length or coiled tubing operations in the field. Moreover, in certain embodiments the coiled tubing unit may comprise onshore coiled tubing units such as a truck mounted coiled tubing unit or larger trailer mounted coiled tubing units. Still further, in other embodiments the coiled tubing unit may comprise offshore coiled tubing units such as those mounted on a lift boat, barge, offshore platform or any other offshore structure.

An injector head may be mounted on a tiltable platform above a substantially horizontal base structure. Typically, the base structure may be mounted on a truck or trailer. One end of the tiltable platform is attached to the base structure at a pivot mount, e.g., pinned or otherwise. The tilt mechanism disclosed herein manipulates the tiltable platform relative to the base structure to raise and lower the injector head for use or transport. The tilt mechanism includes an articulated member and at least one extendable cylinder. One or more cylinders extend to push a joint of the articulated member to an over-center position, thereby locking the articulated member. In the event hydraulic cylinders are used, this allows the articulated member to substantially fully support the load without the need for hydraulic pressure in the cylinders. Thus, a loss of hydraulic power may not adversely affect the system.

The tilt mechanism may include an articulated member. The articulated member may have a joint coupling first and second arms of the member. For example, the joint may include a pin inserted through holes in the arms of the articulated member, or any other type of joint. The first arm may be connected to a pivot point (e.g., pinned or otherwise) on the tiltable platform at an end opposite the joint. The second arm may be connected to a pivot point (e.g., pinned or otherwise) on the base structure at an end opposite the joint.

The tilt mechanism further includes a cylinder having an extendable arm. The cylinder may be attached between the base structure and the articulated member. For example, the cylinder may be attached at a pivot point (e.g., pinned or otherwise) of the base structure and a pivot point (e.g., pinned or otherwise) on the second arm of the articulated member. Alternatively, the cylinder could be attached at a pivot point (not shown) on the first arm. In one embodiment, the cylinder may be a hydraulic cylinder in fluid communication at any pressure with a hydraulic fluid source. In other embodiments, the cylinder may be pneumatic or electric. In yet other embodiments, the cylinder may be mechanical. The tilt mechanism may include one or more extendable cylinders and articulated members on each side of the injector head.

Figure 6:
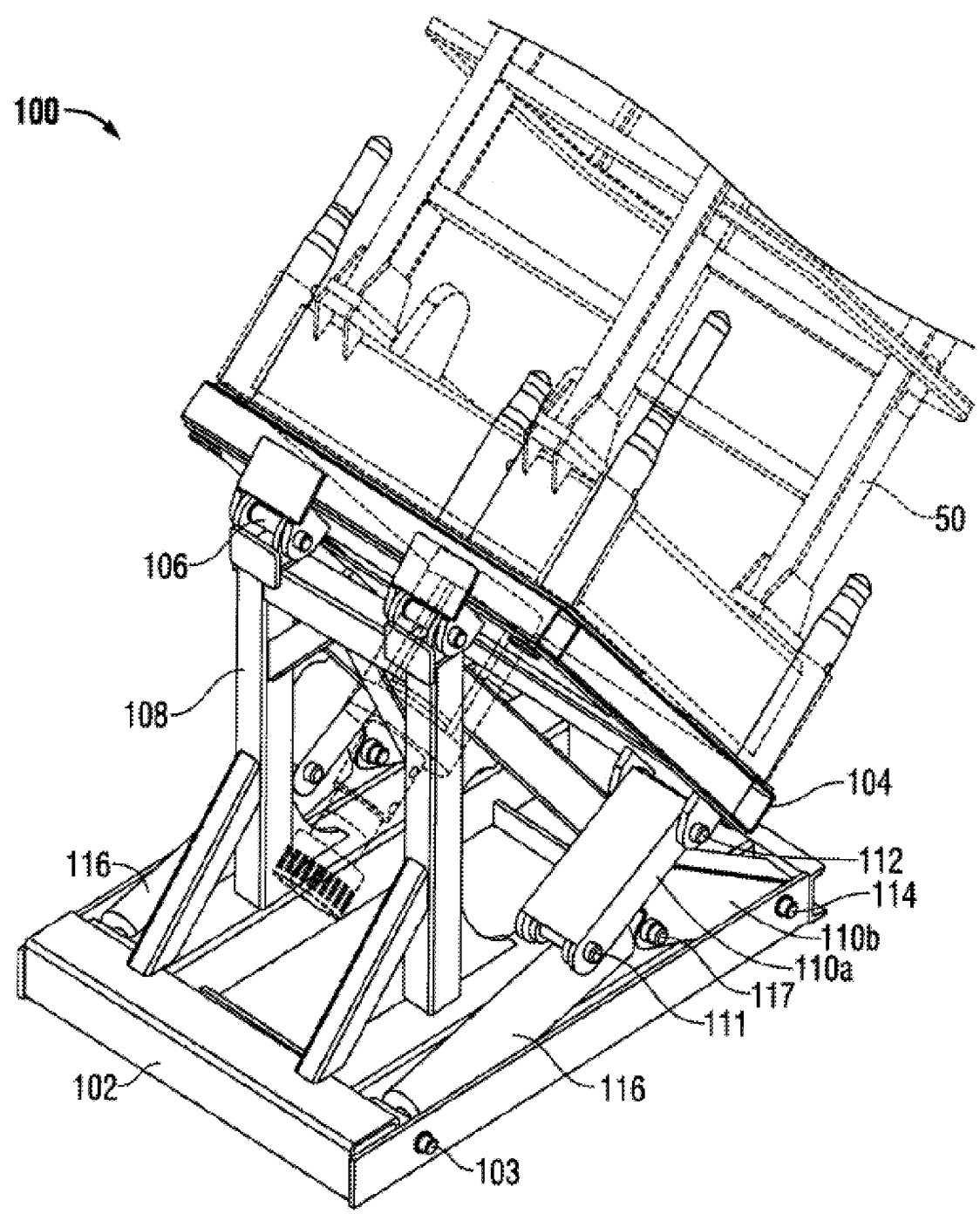
FIG. 6 illustrates a perspective view of an embodiment of an injector head tilt mechanism in a collapsed position.
Figure 7:
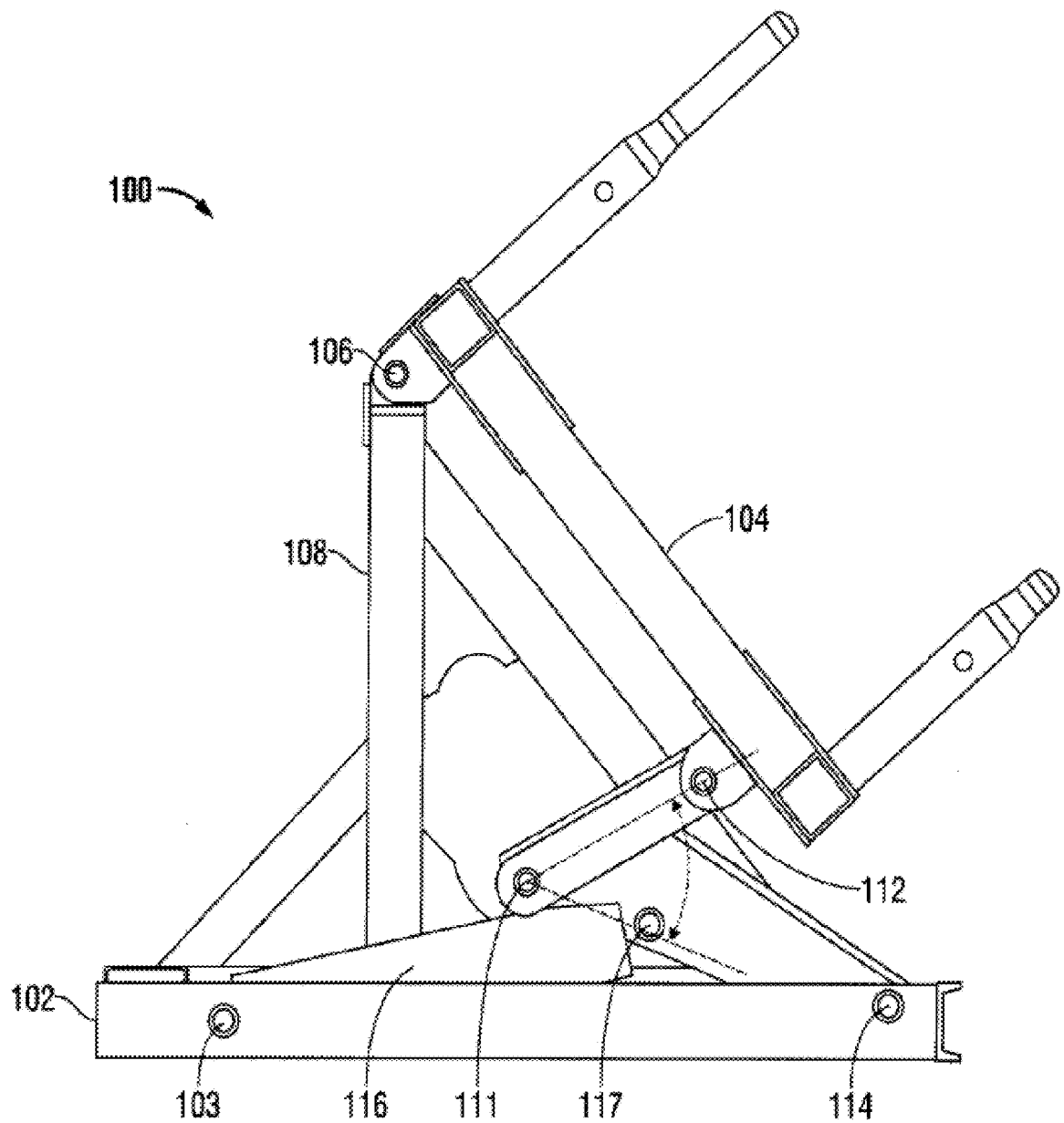
FIG. 7 illustrates a side view of the injector head tilt mechanism of FIG. 6.
Figure 8:
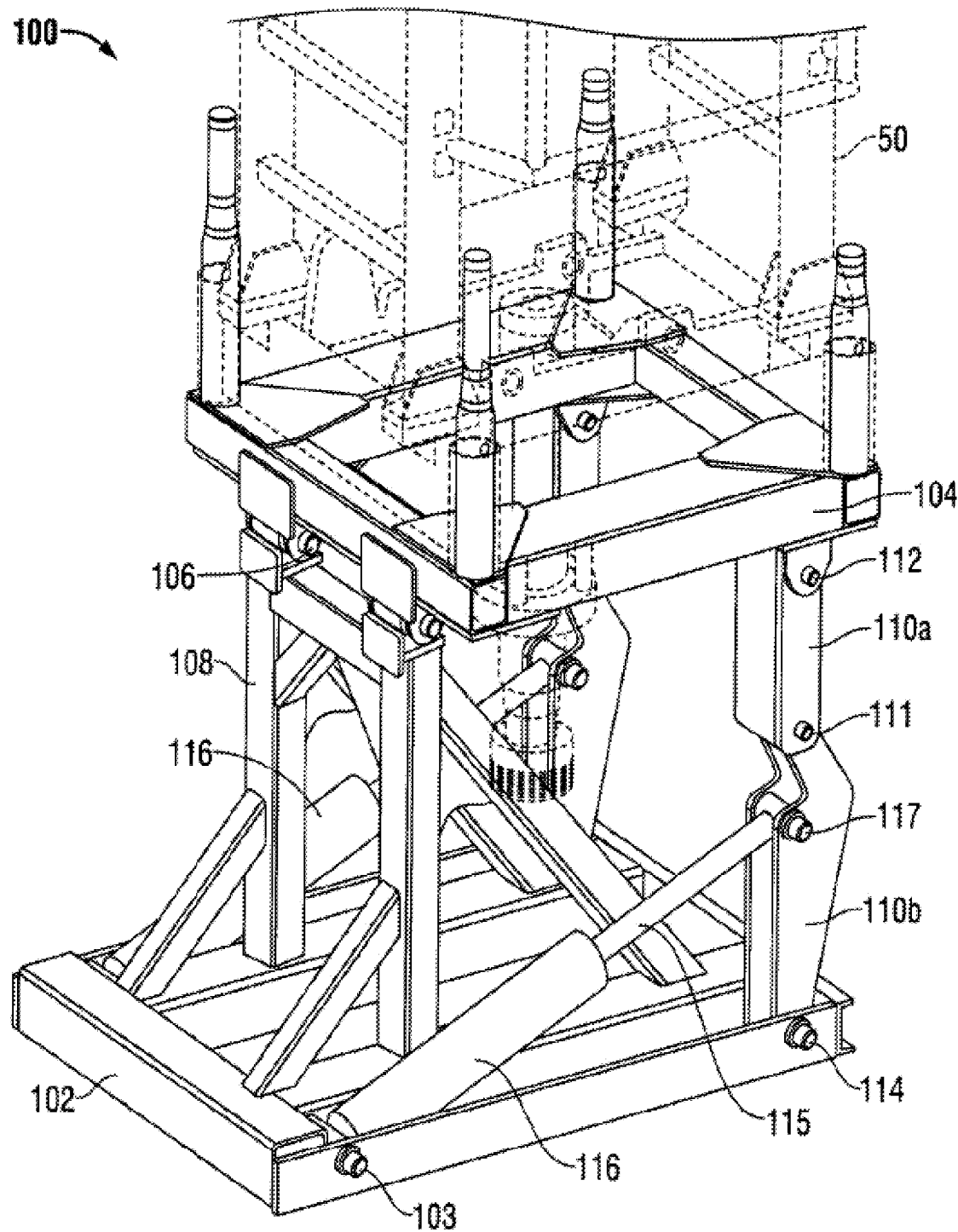
FIG. 8 illustrates a perspective view of an embodiment of an injector head tilt mechanism in an extended position.

FIGS. 6-8 illustrate an embodiment of an injector head tilt mechanism 100. An injector head 50 is mounted on a tiltable platform 104 by any means. The tiltable platform 104 is attached at one end to a pivot point 106, e.g. pinned or otherwise. The pivot point 106 may be located on the distal end of a rigid structure 108 extending upward from a substantially horizontal base structure 102. The base structure 102 may be mounted on a truck or trailer. The base structure 102 may be a commonly known weldment.

The tilt mechanism 100 includes an articulated member 110. The articulated member 110 has a joint 111 coupling first and second arms (110a, 110b) of the member 110. For example, the joint 111 may include a pin inserted through holes in the arms of the articulated member 110, or any other type of joint. The first arm 110a is connected to a pivot point 112 (e.g., pinned or otherwise) on the tiltable platform 104 at an end opposite the joint 111. The second arm 110b is connected to a pivot point 114 (e.g., pinned or otherwise) on the base structure 102 at an end opposite the joint 111.

The tilt mechanism 100 further includes a cylinder 116 having an extendable arm 115. The cylinder 116 may be attached between the base structure 102 and the articulated member 110. For example, the cylinder 116 may be attached at a pivot point 103 (e.g., pinned or otherwise) of the base structure 102 and a pivot point 117 (e.g., pinned or otherwise) on the second arm 110b of the articulated member 110. Alternatively, the cylinder 116 could be attached at a pivot point (not shown) on the first arm 110a. In one embodiment, the cylinder 116 may be a hydraulic cylinder in fluid communication at any pressure with a hydraulic fluid source. In other embodiments, the cylinder 116 may be pneumatic or electric. In yet other embodiments, the cylinder 116 may be mechanical. The tilt mechanism 100 may include one or more extendable cylinders and articulated members on each side of the injector head.

During transport or at other times of nonuse, the injector tilt mount 100 is in the collapsed position (shown in FIG. 6) where the injector head 50 is tilted at an angle, that is, a longitudinal axis of the injector head 50 is not vertical. During use, the injector tilt mount 100 is in the extended position where the longitudinal axis of the injector head 50 is substantially vertical. Methods of using the injector tilt mount include raising the injector head from a collapsed position to an extended position for use, and then lowering the injector head from the extended position to the collapsed position for storage or transport.

To raise the injector head to an extended position (shown in FIG. 8), the cylinders 116 are actuated to extend a cylinder arms 115. The cylinder arms 115 push each respective articulated member 110 near the joint 111 which straightens each articulated member 110 and raises an end of the tiltable platform 104, and accordingly, the injector head 50. Joints 111 of each articulated member 110 are pushed to an over-center position, that is, where the first arm 110a and second arm 110b effectively form a rigid member. In a fully extended position, the articulated member is locked and the injector head 50 and tiltable platform 104 do not rest on the cylinders. In the event that the cylinders are hydraulic and communicating with a hydraulic fluid source, the injector head 50 and tiltable platform 104 do not rest on the hydraulic system, that is, they do not exert back pressure on the hydraulic system because the articulated member is locked. To lower the injector head, the cylinder arms are retracted.

The first arm 110a and second arm 110b of the articulated member 110 are configured to be moved to an over-center position in an extended position of the tilt mechanism. Initially, in a collapsed position, the first arm 110a and second arm 110b may form an acute angle $\alpha$. In an extended position, the first arm 110a and second arm 110b may form an obtuse angle $\alpha$, or an angle $\alpha$ greater than an obtuse angle. As used herein, an "over-center" position may be angle $\alpha$ substantially equal to or greater than 180 degrees. In certain embodiments, the first arm 110a and second arm 110b may engage each other in an extended position, thereby locking the articulated member 110.

In other embodiments, one or more cylinders may be attached to the tiltable platform so that the cylinders push on the tiltable platform. When the cylinder is fully extended it may be mechanically locked using the injector tilt mount lock described above and shown in FIGS. 3-5. In yet other embodiments, when the cylinder is fully extended other mechanical safety locks may be manually or automatically raised into position to support the tiltable platform.

Embodiments

1. A mechanical latching system for an injector head of a coiled tubing unit, wherein the mechanical latching system comprises:
    an injector head comprising a plurality of injector mount posts wherein the injector head is configured to move from a stowed position to an upright position;
    a removable locking pin associated with each of the injector mount posts in the plurality of injector mount posts;
    wherein the removable locking pins are associated with each other and an actuator such that the actuator latches or unlatches all the removable locking pins together.

2. The mechanical latching system of embodiment 1 which further comprises a visual indicator showing whether the removable locking pins are latched or unlatched.

3. The mechanical latching system of embodiment 1 wherein the actuator comprises a rotatable handle for an operator to rotate in order to latch or unlatch the removable pins.

4. The mechanical latching system of embodiment 1 which further comprises:
    one or more hydraulic cylinders for moving the injector head from a stowed position to an upright position; and
    a hydraulic circuit operably connected to the actuator such that the hydraulic circuit prevents movement of the injector head when the mechanical latching system is in an unsecured condition.

5. A method of moving an injector head of a coiled tubing unit from a stowed position to an upright position, wherein the method comprises:

providing a mechanical latching system comprising:
- an injector head comprising a plurality of injector mount posts wherein the injector head is configured to move from a stowed position to an upright position;
- a removable locking pin associated with each of the injector mount posts in the plurality of injector mount posts;
- wherein the removable locking pins are associated with each other and an actuator such that the actuator latches or unlatches all the removable locking pins together; and actuating the actuator to latch or unlatch all the removable locking pins together.

What is claimed is:

1. A mechanical latching system for an injector head of a coiled tubing unit, wherein the mechanical latching system comprises:
   - an injector head comprising a plurality of injector mount posts wherein the injector head is configured to move from a stowed position to an upright position;
   - a removable locking pin associated with each of the injector mount posts in the plurality of injector mount posts;

wherein the removable locking pins are associated with each other and an actuator such that the actuator latches or unlatches all the removable locking pins together; and
   wherein the actuator comprises a rotatable handle for an operator to rotate in order to latch or unlatch the removable pins.

2. The mechanical latching system of claim 1 which further comprises a visual indicator showing whether the removable locking pins are latched or unlatched.

3. A mechanical latching system for an injector head of a coiled tubing unit, wherein the mechanical latching system comprises:
   - an injector head comprising a plurality of injector mount posts wherein the injector head is configured to move from a stowed position to an upright position;
   - a removable locking pin associated with each of the injector mount posts in the plurality of injector mount posts;
   - wherein the removable locking pins are associated with each other and an actuator such that the actuator latches or unlatches all the removable locking pins together; and
   - one or more hydraulic cylinders for moving the injector head from a stowed position to an upright position; and
   - a hydraulic circuit operably connected to the actuator such that the hydraulic circuit prevents movement of the injector head when the mechanical latching system is in an unsecured condition.

4. The mechanical latching system of claim 3 which further comprises a visual indicator showing whether the removable locking pins are latched or unlatched.

5. A method of moving an injector head of a coiled tubing unit from a stowed position to an upright position, wherein the method comprises:
   providing a mechanical latching system comprising:
   - an injector head comprising a plurality of injector mount posts wherein the injector head is configured to move from a stowed position to an upright position;
   - a removable locking pin associated with each of the injector mount posts in the plurality of injector mount posts;
   - wherein the removable locking pins are associated with each other and an actuator such that the actuator latches or unlatches all the removable locking pins together;
   - wherein the actuator comprises a rotatable handle for an operator to rotate in order to latch or unlatch the removable pins; and actuating the actuator to latch or unlatch all the removable locking pins together.

* * * * *